United States Patent [19]

Davis

[11] Patent Number: 5,182,147
[45] Date of Patent: Jan. 26, 1993

[54] COMPOSITE HOSE

[75] Inventor: Eric J. Davis, Wirral, United Kingdom

[73] Assignee: Dantec Ltd., Moreton, England

[21] Appl. No.: 674,359

[22] PCT Filed: Oct. 9, 1988

[86] PCT No.: PCT/GB89/01194
§ 371 Date: Apr. 12, 1991
§ 102(e) Date: Apr. 12, 1991

[87] PCT Pub. No.: WO90/04128
PCT Pub. Date: Apr. 19, 1990

[30] Foreign Application Priority Data

Oct. 14, 1988 [GB] United Kingdom ............... 8824153

[51] Int. Cl.$^5$ ..................... F16L 11/08; B27N 9/00
[52] U.S. Cl. .................... 428/34.4; 428/35.9;
428/36.2; 428/36.3; 428/36.4; 428/36.7;
428/36.91; 428/366; 428/371; 428/377;
428/442; 428/448; 428/450; 428/451; 428/521;
428/429; 428/704; 428/921; 138/124; 138/133;
138/138; 138/144; 138/153; 138/174
[58] Field of Search ............ 428/34.5, 35.9, 36.3,
428/34.6, 35.3, 35.4, 35.8, 35.9, 36.2, 36.3,
36.91, 37, 469, 472, 704, 913, 371, 377, 366, 429,
442, 448, 450, 451, 458, 920, 921, 521; 138/139,
138, 137, 124, 129, 131, 132, 133, 172, 174,
DIG. 10, 144, 153

[56] References Cited

U.S. PATENT DOCUMENTS

| | | | |
|---|---|---|---|
| 3,554,237 | 1/1971 | Pelley | 138/129 |
| 3,901,281 | 8/1975 | Morrisey | 138/140 |
| 3,980,106 | 9/1976 | Wiggins | 138/140 |
| 4,351,364 | 9/1982 | Cocks | 138/138 |
| 4,587,145 | 5/1986 | Kanao | 428/36.3 |

FOREIGN PATENT DOCUMENTS

| | | |
|---|---|---|
| 591560 | 8/1947 | United Kingdom . |
| 627054 | 7/1949 | United Kingdom . |
| 772936 | 4/1957 | United Kingdom . |
| 1303507 | 1/1973 | United Kingdom . |
| 1312509 | 4/1973 | United Kingdom . |

*Primary Examiner*—Ellis P. Robinson
*Assistant Examiner*—Rena Dye
*Attorney, Agent, or Firm*—Zarley, McKee, Thomte, Voorhees & Sease

[57] ABSTRACT

A composite hose comprising an inner helical core (1) made of metal, a plurality of layers of plastics material fibres and films (2, 2a, 2b, 2c) wound on the helical core (1), at least one layer of glass cloth (3) and at least one layer (4) of aluminium foil disposed adjacent one another and wound onto the layers of plastics material fibres and films (2) and an outer helical former (7) made of metallic material.

In an alternative embodiment, at least one layer of ceramic fibres (5) is wound around the plastics material, which layer (5) is covered by at least one winding of a protective layer (6a; 6b).

Such hoses are made by winding the layers successively one upon another on a rotating mandrel.

12 Claims, 2 Drawing Sheets

COMPOSITE HOSE

The present invention relates to a hose and to a method of making such a hose. More particularly, the present invention relates to a flexible hose intended primarily, but not essentially, to carry flammable fuels and oils.

BACKGROUND OF THE INVENTION

Known hoses are generally manufactured in one of two ways. If the material employed is rubber or a synthetic rubber, the hose is generally made by extrusion or by being built-up on a rotating mandrel. In the latter case, the final step of the manufacturing process is a vulcanization stage. A hose produced from these materials may be fire-retardant but not fire-proof. A major disadvantage of such a hose is, however, the difficulty of incorporating other materials therein to vary the characteristics of the finished hose.

The problems associated with natural or synthetic rubber hoses, can, to some extent, be overcome by employing composite hoses. A composite hose, unlike a rubber hose, is built up in unvulcanised layers. Generally speaking, such a hose is produced by initially providing a wire helix which forms, effectively, a hollow internal former. Sheets of fabric and/or plastics material films are then successively wound onto the wire former. Amongst plastics materials which may be employed as the films are polypropylene, polyesters and polytetrafluoroethylene. A further helical wire is then wound around the outermost film or sheet of fabric. This outer wire helix binds the fabric layers and film layers together.

The wound layers of fabric and/or films give the composite hose thus produced greater flexibility than a hose made from natural or synthetic rubber. This is of particular advantage if the intended use of the hose is for loading and unloading petrol tankers and the like or for transferring fuels and oils between a ship and the shore. In addition to the additional flexibility, the advantages of a composite hose over a rubber hose are that it is lighter in weight, cheaper to manufacture and, depending upon the composition of the layers employed, it has a winder range of resistance to chemical corrosion. However, composite hoses have one major disadvantage compared with natural or synthetic rubber hoses. This is the extreme flammability of conventional composite hoses.

SUMMARY OF THE INVENTION

Accordingly, the present invention seeks to provide a composite hose which maintains all of the above-mentioned advantages of composite hoses over natural or synthetic rubber hoses but which is considerably more fireproof than such known composite hoses. Whilst it is impossible to guarantee that any material will be fireproof under all circumstances, the present invention seeks to provide a composite hose chiefly intended for carrying flammable materials which is sufficiently fireproof to ensure that in the event of any danger due to fire occurring, an operator has a sufficient period of time to isolate the area in which the danger has occurred.

According to the present invention there is provided a composite hose comprising an inner helical core of a metallic material, a plurality of layers of plastics material fibers and films wound on said inner core, at least one layer of glass cloth and at least one layer of aluminium foil disposed adjacent one another and wound onto the layers of plastics material fibers and/or films and an outer helical former made of metallic material wound around the layers of glass cloth and aluminium foil.

Also according to the present invention, there is provided a composite hose comprising an inner helical core of a metallic material, a plurality of layers of plastics material fibers and films wound around the helical core, at least one layer of ceramic fibers in woven or felt form wound around the plastics material layers, at least one protective layer wound around the at least one layer of ceramic fibers to protect the fibers from external damage and an outer helical former of a metallic material disposed around the at least one protective layer.

In such a case, it is preferred if at least one winding layer of a glass cloth is incorporated in the hose, said at least one winding layer of glass cloth lying adjacent said at least one layer of ceramic fiber.

Alternatively or additionally, one or more winding layers of aluminium foil are incorporated in the hose, at least one of said aluminium foil layers lying adjacent the at least one layer of ceramic fiber.

In each embodiment, an inner liner of synthetic or natural rubber may be disposed on the helical metallic former between the former and the layers of plastics material fibers and/or films. Furthermore, the hose may include at least one outer layer of polychloroprene impregnated glass cloth located immediately radially inwardly of the outer helical metallic winding. If glass cloth is employed, this is advantageously a graphited glass cloth which incorporates graphite and a silicone therein as a lubricant. Further preferably, and if utilised, the ceramic fibers are an alumina-silica composition. The glass cloth is advantageously made from borosilicate glass.

In one embodiment, a hose according to the invention comprises an inner helical former made of a metallic material, a natural or synthetic rubber liner disposed around the helical former, a plurality of layers of plastics material fibers and/or films disposed around said rubber layer, a layer of graphite glass cloth disposed around the plastics material layers, at least one layer of aluminium foil disposed around the at least one glass cloth layer, at least one layer of ceramic fibers disposed around the double layer of aluminium foil, a layer of graphited glass cloth disposed around the at least one layer of ceramic fiber, at least one layer of polychloroprene impregnated glass cloth wound around the at least one layer of graphite glass cloth and an outer helical winding made of a metallic wire. The helical inner former and outer winding are preferably made of steel wire which is advantageously plastic coated.

In such embodiment, layers of ceramic fibers, glass cloth and aluminium foil are all present. These materials have complementary characteristics. Thus, although ceramic fibers are weak mechanically, they are flexible. They also give an extremely high degree of thermal insulation per unit thickness. The final advantage of ceramic fibers is that they are inexpensive. It is already known to incorporate glass cloth in composite hoses, but not in combination with other materials such as ceramic fibers and aluminium foil. Glass cloth is stronger mechanically than ceramic fibers but is more expensive and is not as efficient a thermal insulator. Finally, the aluminium foil is present primarily to reflect radiant heat. Such material, has however, little mechanical strength.

In a particularly preferred embodiment, the plurality of layers of plastics material fibers and films disposed between the inner helical core and the at least one layer of glass cloth comprises at least one inner reinforcement layer and at least one outer reinforcement layer, said reinforcement layers being formed from plastics martial fibers, and a plurality of sealing layers disposed between said at least one inner reinforcement layers and said at least one outer reinforcement layer, said sealing layers being formed from plastics material films.

In an alternative arrangement according to the present invention, there is provided a method of making a composite hose comprising the steps of disposing a helically wound metallic inner core member on a rotating mandrel, winding a plurality of layers of plastics material fibers and films around the inner former, winding at least one layer of ceramic fiber around the plastics material layers, winding at least one protective layer around the at least one layer of ceramic fiber and disposing a helically wound metallic outer core around the at least one protective layer.

The invention will be further described, by way of example, with reference to the accompanying drawings, in which:

DETAILED DESCRIPTION OF THE PREFERRED EMBODIMENT

Figure 1:
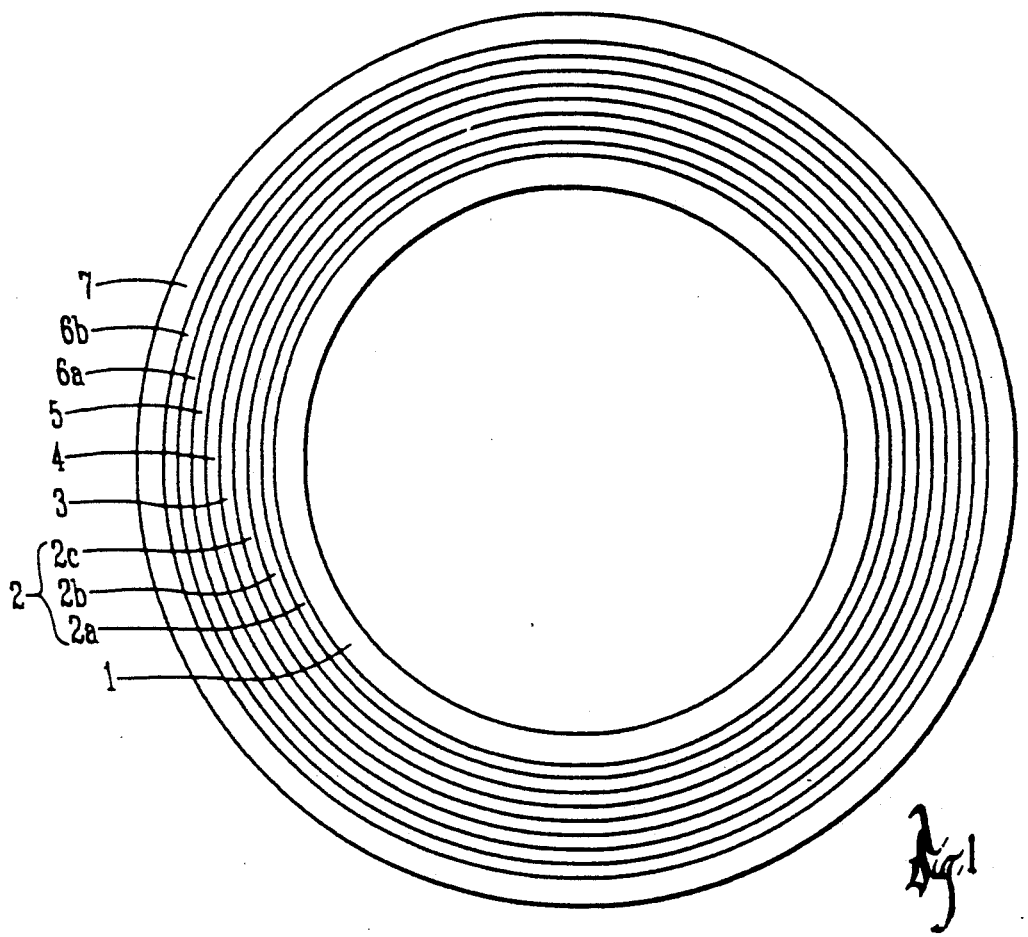
FIG. 1 is a transverse section through a first embodiment of a composite hose in accordance with the present invention.
Figure 2:
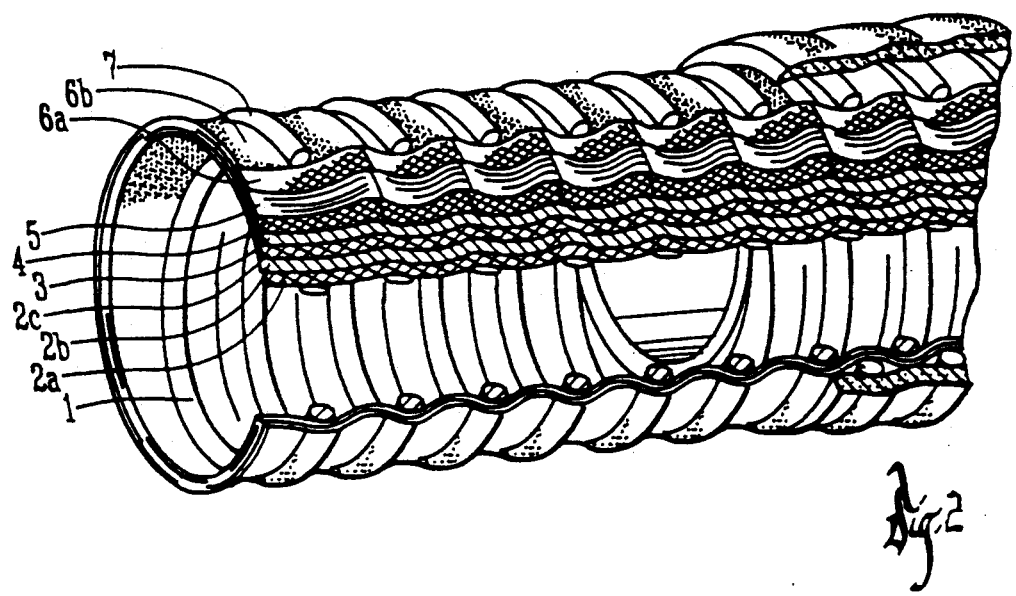
FIG. 2 is an elevational view, cut away to show the various layers, of a composite hose in accordance with the present invention.

Referring now to the FIGS. 1 and 2 of the drawings there is shown therein a composite hose which comprises a helical inner former made from metallic wire such as galvanised steel wire. If described, the steel wire may be provided with a coating of plastics material. The steel wire forms an inner former 1 around which are wound a plurality of layers 2 of plastics material fibers and films. These comprise an inner reinforcement layer 2a of a polypropylene fiber, a plurality of layers 2b of polypropylene films and polyester films and two outer reinforcement layers 2c of polypropylene fibers. Radially outwardly of the layers of plastics material fibers and/or films is a first winding of a graphited glass cloth material 3. The glass cloth winding 3 is surrounded by at least one winding 4 of aluminium foil. Externally of the aluminium foil is at least one winding 5 of a ceramic fiber which, in the present embodiment, is in the form of an alumina-silica composition spun into fibers, such as Fiberfrax (Registered Trade Mark) aluminium silica fibers. Around the at least one layer of ceramic fiber is a further layer 6a, again in the form of a winding, of glass cloth. The hose has an outer winding layer of a polychloroprene impregnated glass cloth 6b, the polychloroprene used to impregnate the glass cloth being Neoprene (Registered Trade Mark). Finally, a helical steel winding 7 is wound around the outer layer 6b of the polychloroprene impregnated glass cloth.

Figure 3:
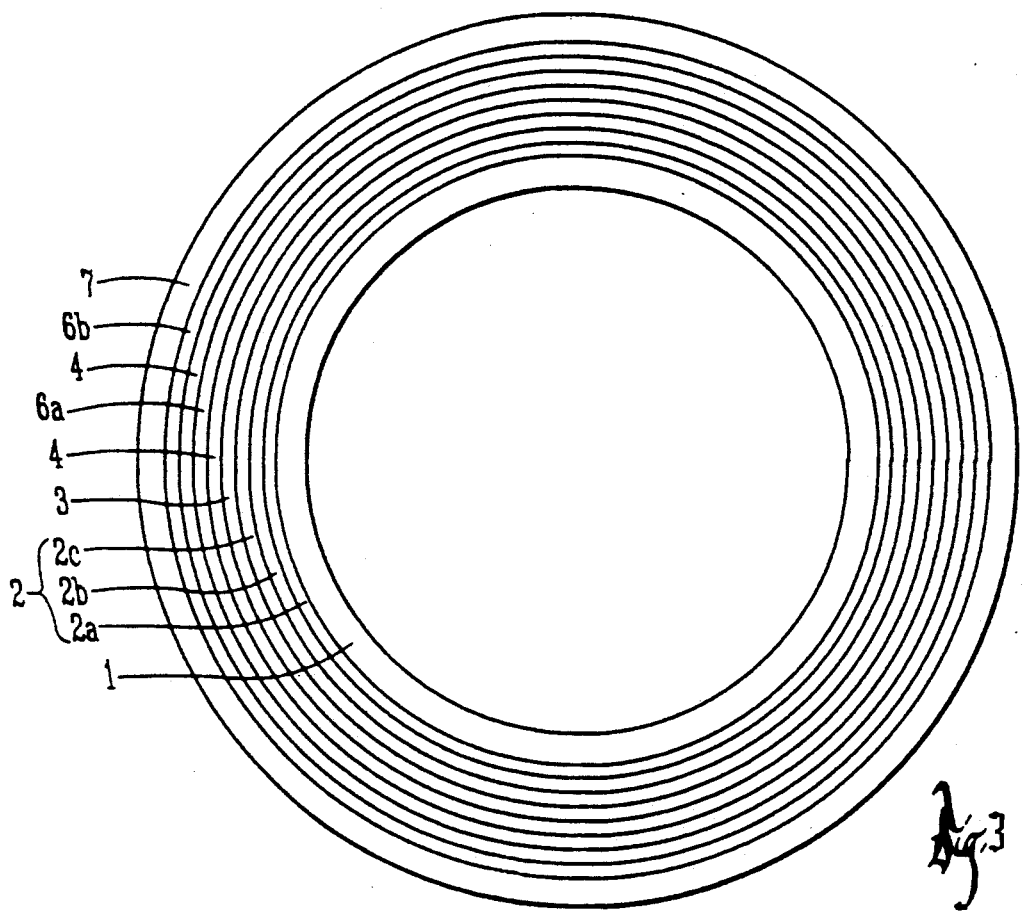
FIG. 3 is a view similar to FIG. 1 of a second embodiment of a composite hose in accordance with the present invention.
Figure 4:
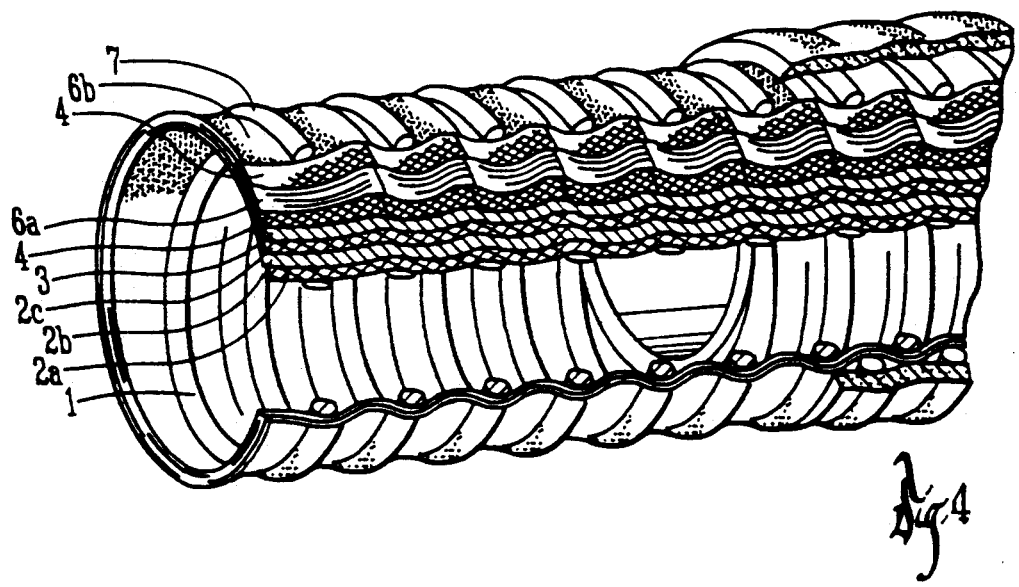
FIG. 4 is a view similar to FIG. 2 of the hose shown in FIG. 3.

The hose shown in FIGS. 3 and 4 is basically similar to that shown in FIGS. 1 and 2 and identical reference numerals have been employed to denote like features. However, in this embodiment there is no winding of ceramic fiber 5. Moreover, between the layers 6a and 6b of glass cloth, a further winding layer of aluminium foil 4 is interposed.

One example of a composite hose will now be described in greater detail. The inner former 1 is formed from galvanised mild steel wire having a diameter of 4 mm. A single winding polypropylene having a thickness of 0.6 mm is then wound around the former 1. In this connection, it is pointed out that the wire is disposed on a mandrel which rotates and the polypropylene is disposed on a reciprocating carriage. The carriage travels parallel to the longitudinal axis of the mandrel but spaced therefrom. The passage of the carriage from the first end of the mandrel to the second end thereof and back to the first end is referred to as a single pass and, in the context of the present invention. produces a single layer of polypropylene on the former. This acts as an inner reinforcement.

Thereafter, 28 layers of polypropylene are wound onto such reinforcement, each layer having a thickness of 0.04 mm. This is then covered with four layers of polyester each having a thickness of 0.025 mm. These thirty-two layers act as a sealant. Around the sealant layers are provided two layers of an outer reinforcement which is made of polypropylene having a thickness of 0.6 mm.

These are then alternately wound around the outer reinforcement, two thermal barrier layers formed from graphite glass cloth, each having a thickness of 0.33 mm and two sealing film layers of aluminium foil each having a thickness of 0.025 mm. These are surrounded by a cover layer of neoprene-coated glass cloth having a thickness of 0.75 mm and an outer former made from helically wound galvanised mild steel having a diameter of 3.55 mm.

A hose formed in this manner can be treated by suspending a 1.5 m length of the hose at a height of 0.5, over a paraffin tray fibre having a diameter of 1 m. The hose is filled with paraffin pressurised to a pressure of approximately 345,000 N/M$^2$.

The temperature of the fire may rise to as high as 900° C. Table I below shows the pressure subsisting within the hose at various times after the fire has started.

TABLE I

| Time (seconds) | Pressure (N/M$^2$) |
|---|---|
| 0 | 345,000 |
| 20 | 262,000 |
| 60 | 241,310 |
| 120 | 248,120 |
| 180 | 345,000 |
| 240 | 448,420 |
| 300 | 620,530 |
| 360 | 482,630 |
| 420 | 306,845 |
| 600 | 153,420 |

It will be seen from the above table that the hose commences to fail after 300 seconds such failure is gradual and is exhibited by a slow permeation of the paraffin through the outer layers of the hose as the inner reinforcement and sealing layers begin to melt. The test can be continued for 900 seconds. If the fire is then extinguished, it is found that the carcase of the hose is still basically intact and that there is still unburnt fuel within the hose.

The use of the polyester in the hose is important because of its high melting point. This extends the time before which the hose fails by vapour seepage. Similarly, the glass cloth layers increase the insulation effect and further extend the pre-failure time.

It will also be seen from the above table that there is a pressure drop when the hose is first subjected to the heat of the fire. This is due to the fact that the inner and outer steel formers expand and permit the hose to extend.

One of the inherent advantages of the hose of the present invention is that the fibrous layers are porous. Accordingly, in the event of a fire, the hose is initially fire-free and is then followed by evaporation of the fuel or gas through the layers. The evaporated material can then burn in a manner akin to a gas burner.

The number of layers of aluminium is also of importance. If more than two layers of aluminium are utilised, the heat of the fire will eventually cause the hose to explode. This is because the internal pressure within the hose increases with temperature and the extra aluminium prevents the evaporated fuel or gas from escaping. This latter feature is not, however, necessarily a disadvantage. In fact, the bursting of the hose, after a flame-free period is desirable if the hose is being used to transport liquefied petroleum gas because such gas burns off in a relatively controlled manner.

I claim:

1. A fire-resistant composite hose for transporting flammable liquids, comprising:
   an inner helical core of a metallic material;
   a first layer of plastics material fibers helically wound on said inner core to prevent the inner core from damaging the hose;
   a plurality of layers of plastics material films helically wound around the first fibers layer to seal the hose and to prevent flammable liquid from permeating through the hose;
   a second layer of plastics material fibers wrapped around the films layer for providing a working pressure to the hose;
   at least one layer of glass cloth for thermal insulation and at least one layer of aluminum foil to reflect heat disposed adjacent one another and helically wound onto the second layer of plastics material fibers; and
   an outer helical former made of metallic material wound around the layers of glass cloth and aluminum foil.

2. A composite hose as claimed in claim 1 wherein said plastics material is a polyester, polytetrafluoroethylene or polypropylene.

3. A composite hose as claimed in claim 1 wherein the hose additionally includes at least one helically wound layer of polychloroprene-impregnated glass cloth located immediately radially inwardly of said outer helical metallic former.

4. A composite hose as claimed in claim 3 wherein the glass cloth is made from borosilicate glass.

5. A composite hose as claimed in claim 3 wherein the glass cloth is a graphited glass cloth which incorporates graphite and a silicone therein as a lubricant.

6. A composite hose as claimed in claim 1 wherein the inner core and outer former are both formed from galvanised mild steel.

7. A fire-resistant composite hose for transporting flammable liquids, comprising:
   an inner helical core of a metallic material;
   at least one reinforcement winding layer of a plastics material fiber helically wound around said inner core;
   a plurality of sealant winding layers of plastics material films helically wound around said fiber winding layer;
   at least one further reinforcement winding layer of plastics material fibers helically wound around said plurality of film winding layers;
   at least two thermal barrier winding layers helically wound around said at least one further reinforcement winding layer of plastics material fibers, said thermal barrier winding layers comprising, alternately, aluminum foil and glass cloth; and
   an outer helical former of a metallic material helically wound around said thermal barrier winding layers.

8. A composite hose as recited in claim 7, wherein said plastics material is a polyester, polytetrafluoroethylene or polypropylene.

9. A composite hose as recited in claim 7, wherein said hose additionally comprises at least one helically wound layer of polychloroprene-impregnated glass cloth located immediately radially inwardly of said outer helical metallic former.

10. A composite hose is recited in claim 9, wherein said glass cloth is made from borosilicate glass.

11. A composite hose as recited in claim 9, wherein said glass cloth is a graphited glass cloth which incorporates graphite and a silicone therein as a lubricant.

12. A composite hose as recited in claim 7, wherein said inner core and said outer former are both formed from galvanized mild steel.

* * * * *